(12) United States Patent
Chen

(10) Patent No.: US 12,093,360 B2
(45) Date of Patent: Sep. 17, 2024

(54) VERIFICATION METHOD AND VERIFICATION SYSTEM BASED ON BIOMETRIC FEATURE ID CHAIN, AND USER TERMINAL

(71) Applicant: CHINA UNIONPAY CO., LTD., Shanghai (CN)

(72) Inventor: Chengqian Chen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/257,281

(22) PCT Filed: Sep. 9, 2021

(86) PCT No.: PCT/CN2021/117470
§ 371 (c)(1),
(2) Date: Jun. 13, 2023

(87) PCT Pub. No.: WO2022/166198
PCT Pub. Date: Aug. 11, 2022

(65) Prior Publication Data
US 2024/0054199 A1    Feb. 15, 2024

(30) Foreign Application Priority Data
Feb. 5, 2021  (CN) .......................... 202110160183.3

(51) Int. Cl.
*G06F 21/32*  (2013.01)
(52) U.S. Cl.
CPC ..................... *G06F 21/32* (2013.01)
(58) Field of Classification Search
CPC ..................................................... G06F 21/32
See application file for complete search history.

(56) References Cited

U.S. PATENT DOCUMENTS 8,800,003 B2 *  8/2014  Guo ..................... H04L 63/0823
                                                                726/4
10,142,333 B1 *  11/2018  Griffin .................. H04L 9/3231
(Continued)

FOREIGN PATENT DOCUMENTS

CN        105068974 A      11/2015
CN        106651363 A       5/2017
(Continued)

OTHER PUBLICATIONS

International Application No. PCT/CN2021/117470, International Search Report, dated Nov. 26, 2021.
(Continued)

*Primary Examiner* — James R Turchen
(74) *Attorney, Agent, or Firm* — MARSHALL, GERSTEIN & BORUN LLP

(57) ABSTRACT

The invention relates to a verification method and a verification system based on a biometric feature ID chain. The method includes: acquiring a biometric feature to be verified; comparing the biometric feature to be verified with a biometric feature template in an old biometric feature template region, and comparing the biometric feature to be verified with a biometric feature template in a current biometric feature template region, to respectively match at least two biometric feature IDs; generating a biometric feature ID chain on the basis of the at least two biometric feature IDs; and sending a user ID, a device ID and the biometric feature ID chain to a backend for identity verification. In the invention, a biometric feature ID chain containing the biometric feature history of a unified user terminal is generated when a biometric feature is re-entered at a local user terminal.

16 Claims, 4 Drawing Sheets

(56) References Cited

U.S. PATENT DOCUMENTS

| | | | |
|---|---|---|---|
| 10,789,345 B1 | 9/2020 | Larimer et al. | |
| 10,963,867 B2 | 3/2021 | Lu et al. | |
| 11,144,772 B2* | 10/2021 | Li | G06V 10/993 |
| 2006/0215883 A1* | 9/2006 | Kim | G06F 18/00 |
| | | | 382/115 |
| 2010/0009658 A1 | 1/2010 | Wu et al. | |
| 2015/0234881 A1 | 8/2015 | Hirata et al. | |
| 2016/0379211 A1* | 12/2016 | Hoyos | H04L 63/0861 |
| | | | 705/75 |
| 2018/0145833 A1 | 5/2018 | Lin | |
| 2019/0172281 A1* | 6/2019 | Einberg | G06F 3/013 |
| 2019/0251393 A1* | 8/2019 | Jiang | G06V 40/1347 |
| 2022/0277065 A1* | 9/2022 | Patel | G06F 21/32 |
| 2023/0394127 A1* | 12/2023 | Tussy | H04L 63/123 |

FOREIGN PATENT DOCUMENTS

| | | |
|---|---|---|
| CN | 110084019 A | 8/2019 |
| CN | 110933603 A | 3/2020 |
| CN | 111414599 A | 7/2020 |
| CN | 111639361 A | 9/2020 |
| CN | 112287320 A | 1/2021 |
| CN | 113297552 A | 8/2021 |
| JP | 2006085268 A | 3/2006 |
| JP | 2014067171 A | 4/2014 |
| JP | 2017055384 A | 3/2017 |
| TW | I667585 B | 8/2019 |
| TW | M594186 U | 4/2020 |
| TW | 202024975 A | 7/2020 |
| TW | 202037117 A | 10/2020 |
| WO | WO-2017/177435 A1 | 10/2017 |

OTHER PUBLICATIONS

Japanese Patent Application No. 2022-576855, Office Action, mailed Dec. 25, 2020.

International Application No. PCT/CN2021/117470, Written Opinion, mailed Nov. 26, 2021.

* cited by examiner

VERIFICATION METHOD AND VERIFICATION SYSTEM BASED ON BIOMETRIC FEATURE ID CHAIN, AND USER TERMINAL

CROSS-REFERENCE TO RELATED APPLICATIONS

This application is a national application of PCT/CN2021/117470, filed on Sep. 9, 2021, which claims priority over a Chinese patent application 202110160183.3, filed with the State Intellectual Property Office of P. R. China on Feb. 5, 2021 and entitled "Verification Method and Verification System Based on Biometric Feature ID Chain, and User Terminal", both of which are incorporated herein by reference in their entireties.

TECHNICAL FIELD

The present invention relates to computer technology, in particular to a verification method, a verification system and a user terminal.

BACKGROUND

With the popularity of fingerprint mobile phones, more and more service functions apply fingerprint-based identity authentication, unlocking services by user fingerprints. In the conventional approaches, the mode for fingerprint verification mainly includes:
(1) Identity authentication registration phase: the user terminal acquires the fingerprint ID, and sends the fingerprint ID together with the user ID to the identity authentication backend to complete the registration.
(2) Identity authentication verification phase: after the fingerprint verification is passed, the user terminal sends the fingerprint ID and user ID acquired to the identity authentication backend. The identity authentication backend matches the fingerprint ID and user ID with those stored in the identity authentication backend, where if the matching result is consistent, the identity authentication succeeds, and if the matching result is inconsistent, the identity authentication fails.

Such method of matching by acquiring the fingerprint ID of the user terminal can solve the problem of specified fingerprint verification. However, the user terminal generates the fingerprint ID for each input randomly. That is, for the same user terminal, the fingerprint ID generated for every single input is different, which leads to the following problem: when the user registers a specified finger during the identity authentication registration phase and the fingerprint of this user terminal is later deleted in the user terminal, the same finger can no longer be used to complete the identity authentication when this same finger is re-entered into the user terminal subsequently. This will affect the entire process of identity authentication, causing the problem that the fingerprint for identity authentication cannot be cancelled, the identity authentication backend may keep accumulating user fingerprints binding garbage data.

SUMMARY

In view of the above, some aspects of the present invention aims to provide a verification method based on biometric feature ID chain and a verification system based on biometric feature ID chain that can solve the problem that the same biometric feature cannot be used after being deleted and re-entered.

According to one aspect of the present invention, a verification method based on biometric feature ID chain is provided, which includes:
an acquisition step for a user terminal acquiring a biometric feature to be verified;
a comparison step for the user terminal comparing the biometric feature to be verified with a biometric feature template in an old biometric feature template region, and comparing the biometric feature to be verified with a biometric feature template in a current biometric feature template region, to match at least two biometric feature IDs;
an ID chain generation step for the user terminal generating a biometric feature ID chain based on the at least two biometric feature IDs;
a sending step for the user terminal sending a user ID, a device ID and the biometric feature ID chain to a backend; and
an verification step for the backend performing identity verification based on the user ID, the device ID, and the biometric feature ID chain received and a binding relationship pre-stored.

According to another aspect of the present invention, a verification method based on biometric feature ID chain is provided, which includes:
an acquisition step of acquiring a biometric feature to be verified;
a comparison step of comparing the biometric feature to be verified with a biometric feature template in an old biometric feature template region, and comparing the biometric feature to be verified with a biometric feature template in a current biometric feature template region, to match at least two biometric feature IDs;
an ID chain generation step of generating a biometric feature ID chain based on the at least two biometric feature IDs; and
a sending step of sending a user ID, a device ID and the biometric feature ID chain to a backend for identity verification.

According to another aspect of the present invention, a verification system based on biometric feature ID chain comprising a backend and a user terminal is provided,
wherein, the user terminal includes:
a biometric feature module for collecting a first biometric feature and a second biometric feature, and respectively generating a biometric feature template and a first biometric feature ID corresponding to the first biometric feature and a biometric feature template and a second biometric feature ID corresponding to the second biometric feature, and for collecting a biometric feature to be verified, and on the other hand, for matching at least two biometric feature IDs based on the biometric feature to be verified and generating a biometric ID chain based on the at least two biometric feature IDs, where the first biometric feature ID of the first biometric feature and the second biometric feature ID of the second biometric feature are randomly generated respectively, and
an identity verification module for performing data interaction with the backend and calling the biometric feature module for identity verification; and
wherein, the backend includes:
a storage module for receiving the first biometric feature ID, the user ID and device ID sent by the user terminal, and establishing and storing a binding relationship between the first biometric feature ID and the user ID and device ID; and a verification module for performing identity verification based on the biometric feature ID chain, the user ID and the device ID received from the user terminal and the binding relationship stored in the storage module.

According to another aspect of the present invention, a user terminal is provided, which includes:

a biometric feature module for collecting a first biometric feature and a second biometric feature, and respectively generating a biometric feature template and a first biometric feature ID corresponding to the first biometric feature and a biometric feature template and a second biometric feature ID corresponding to the second biometric feature, and for collecting a biometric feature to be verified, and on the other hand, for matching at least two biometric feature IDs based on the biometric feature to be verified and generating a biometric feature ID chain based on the at least two biometric feature IDs, where the first biometric feature ID of the first biometric feature and the second biometric feature ID of the second biometric feature are randomly generated; and an identity verification module for sending the first biometric feature ID, user ID and device ID to the backend to establish a binding relationship between the first biometric feature ID and the user ID and device ID, and on the other hand, for sending the user ID, device ID and biometric feature ID chain to the backend for identity verification based on the binding relationship and the biometric feature ID chain.

According to another aspect of the present invention, a computer readable medium with a computer program stored thereon is provided, wherein, the computer program implements the verification method based on biometric feature ID chain when executed by a processor.

According to another aspect of the present invention, a computer device is provided, which includes a storage module, a processor, and a computer program stored in the storage module and capable of running on the processor, wherein the processor implements the verification method based on biometric feature ID chain when executing the computer program.

DETAILED DESCRIPTION

Some of the multiple embodiments of the present invention are introduced below to provide a basic understanding of the present invention. It is not intended to determine the key or decisive elements of the present invention or limit the scope of protection of the present invention.

For brevity and illustrative purposes, this text mainly refers to its exemplary embodiments to describe the principles of the present invention. However, those skilled in the art will readily recognize that the same principles can be equally applied to all types of verification method based on biometric feature ID chain and verification system based on biometric feature ID chain, and these same principles can be implemented therein, where any such changes do not deviate from the true spirit and scope of the present patent application.

In addition, in the following description, reference is made to the accompanying drawings, which illustrate specific exemplary embodiments. Electrical, mechanical, logical, and structural changes can be made to these embodiments without departing from the spirit and scope of the present invention. Moreover, although the features of the present invention are disclosed in conjunction with only one of several implementations/embodiments, on the condition that any given or identifiable function may be found to be desired and/or advantageous, these features can be combined with one or more other features of other implementations/embodiments. Therefore, the following description should not be considered in a limiting sense, and the scope of the present invention is defined by the appended claims and their equivalents.

Terms such as "have", "include" and the like mean that in addition to the units (modules) and steps that are directly and clearly stated in the specification and claims, the technical solution of the present invention does not exclude the scenarios of having other units (modules) and steps that are not directly or explicitly stated.

The concept of the present invention is to obtain the historical biometric feature ID information of the same biometric feature on the same user terminal, and complete the identity verification by uploading the biometric feature ID chain to the backend, which queries and determines whether the current biometric feature of the user and the biometric feature in the previous registration phase for identity authentication belong to the same biometric feature so as to determine the matching relationship during the identity verification.

Figure 1:
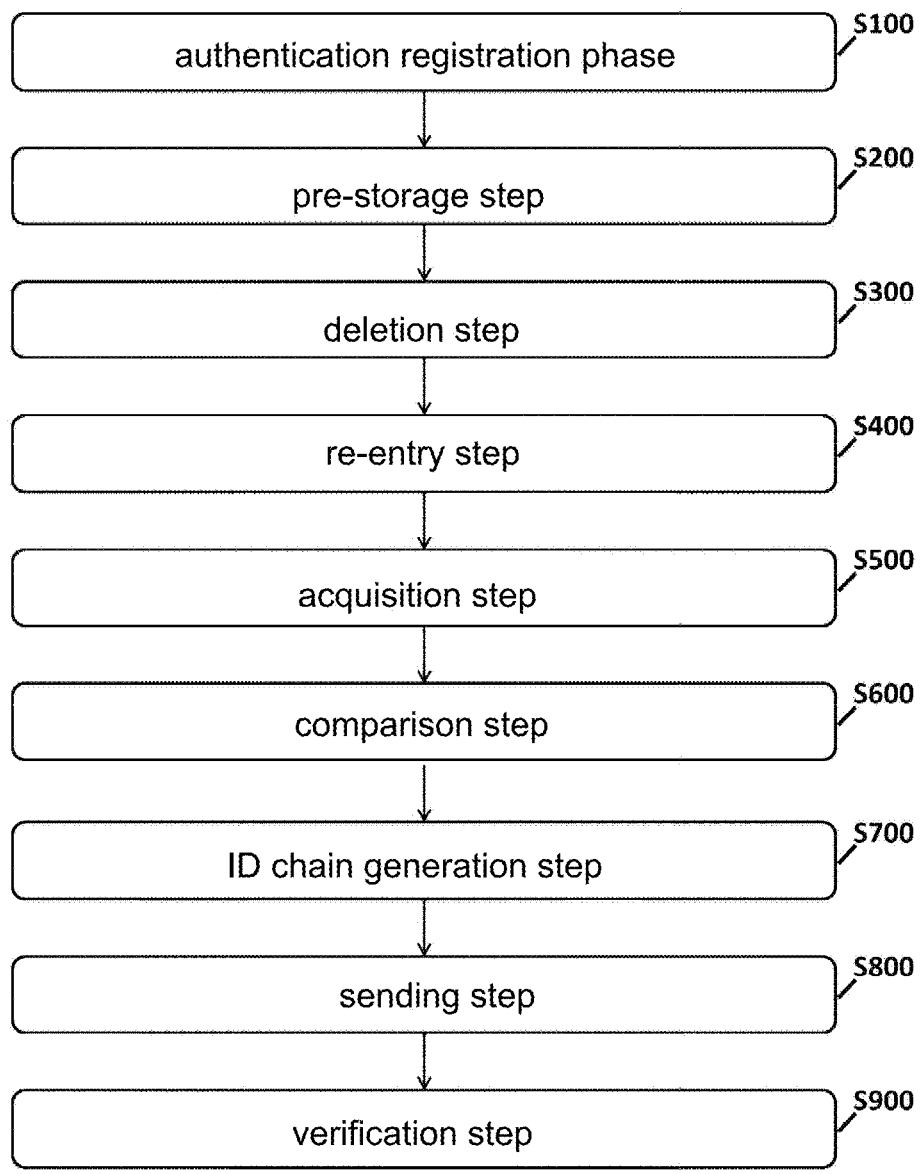
FIG. 1 is a flow diagram of a verification method based on biometric feature ID chain according to one aspect of the present invention.

FIG. 1 is a flow diagram of a verification method based on biometric feature ID chain according to one aspect of the present invention.

As shown in FIG. 1, the verification method based on biometric feature ID chain according to one aspect of the present invention mainly includes the following steps:

an authentication registration step S100: at the time of registration, the user terminal acquires a first biometric feature, generates a corresponding first biometric feature template and a first biometric feature ID based on the first biometric feature, places the first biometric feature template and the first biometric feature ID into a current biometric feature template region, and sends the first biometric feature ID, user ID and device ID to the backend;

a pre-storage step S200: the backend receives the first biometric feature ID, user ID and device ID from the user terminal, and establishes and stores a binding relationship between the first biometric feature ID and the user ID and device ID;

a deletion step S300: the user terminal acquires an instruction to delete the first biometric feature, deletes the biometric feature template and the first biometric feature ID of the first biometric feature from the current biometric feature template region, and stores them in an old biometric feature template region.

a re-enter step S400: the user terminal acquires a second biometric feature, generates a corresponding biometric feature template and a second biometric feature ID based on the second biometric feature, stores the biometric feature template and the second biometric feature ID of the second biometric feature in the current biometric feature template region, where the second biometric feature is the same as the first biometric feature, e.g., the fingerprint of the same finger;

an acquisition step S500: the user terminal acquires a biometric feature to be verified;

a comparison step S600: the user terminal compares the biometric feature to be verified with the biometric feature template in the old biometric feature template region, and compares the biometric feature to be verified with the biometric feature template in the current biometric feature template region, to match at least two biometric feature IDs;

an ID chain generation step S700: the user terminal generates a biometric feature ID chain based on the at least two biometric feature IDs;

a sending step S800: the user terminal sends a user ID, a device ID and the biometric feature ID chain to the backend; and a verification step S900: the backend performs identity verification based on the received user ID, device ID and the biometric feature ID chain as well as the pre-stored binding relationship.

Wherein, in the verification step S900, the backend verifies whether the first biometric feature ID stored in the binding relationship is included in the biometric feature ID chain, and if so, the identity verification is successful. In addition, in the verification step S900, if the identity verification is successful, the first biometric feature ID in the binding relationship is updated to the second biometric feature ID.

Preferably, in the authentication registration step S100, the public key is sent to the backend along with the first biometric feature ID of the first biometric feature, user ID, and device ID.

Figure 2:
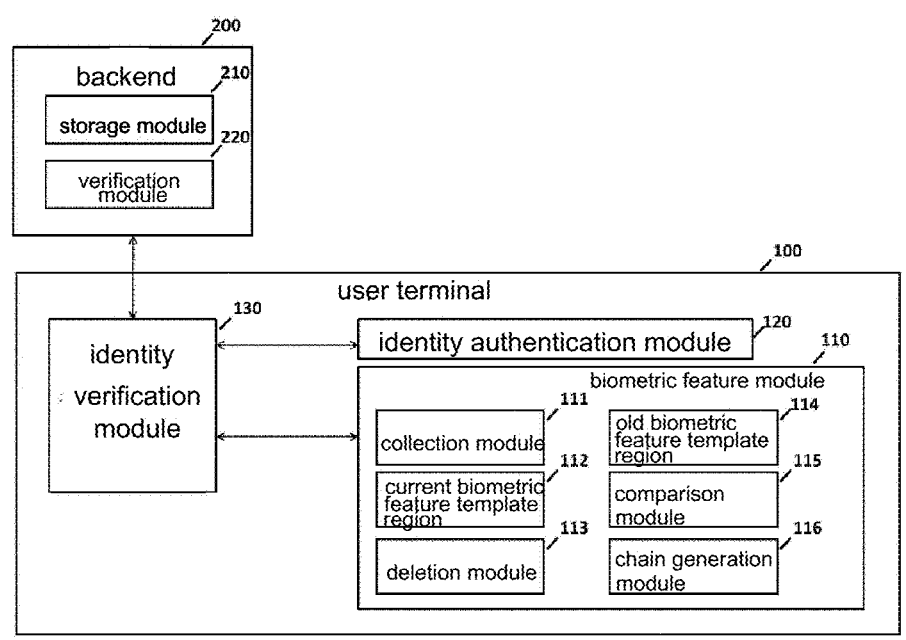
FIG. 2 is a structural diagram of a verification system based on biometric feature ID chain according to one aspect of the present invention.

FIG. 2 is a structural diagram of a verification system based on biometric feature ID chain according to one aspect of the present invention.

As shown in FIG. 2, a verification system based on biometric feature ID chain according to one aspect of the present invention includes a user terminal 100 and a backend 200.

The user terminal 100 includes:
a biometric feature module 110 for collecting a first biometric feature and a second biometric feature, and respectively generating a biometric feature template and a first biometric feature ID corresponding to the first biometric feature and a biometric feature template and a second biometric feature ID corresponding to the second biometric feature, and for collecting a biometric feature to be verified, and on the other hand, for matching at least two biometric feature IDs based on the biometric feature template of the biometric feature to be verified and generating a biometric feature ID chain based on the at least two biometric feature IDs, where the first biometric feature ID of the first biometric feature and the second biometric feature ID of the second biometric feature of the first biometric feature are randomly generated, respectively;

an identity authentication module 120 for generating a public key and signing data using the public key; and an identity verification module 130 for performing data interaction with the backend 200 and calling the biometric feature module 110 and the identity authentication module 120 for identity verification;

wherein, the biometric feature module 110 includes:
a collection module 111 for collecting the first biometric feature and generating the biometric feature template and the first biometric feature ID corresponding to the first biometric feature, and collecting the second biometric feature and generating the biometric feature template and the second biometric feature ID corresponding to the second biometric feature, and for collecting the biometric feature to be verified;

a current biometric feature template region 112 for storing the biometric feature template and the biometric feature ID of the first or second biometric feature collected by the collection module 111;

a deletion module 113 for deleting the biometric feature template and the biometric feature ID stored in the current biometric feature template region 112 according to a deletion instruction;

an old biometric feature template region 114 for storing the biometric feature template and the biometric feature ID of the biometric feature deleted by the deletion module 113;

a comparison module 115 for matching the biometric feature to be verified with the biometric feature template in the old biometric feature template region and the biometric feature template in the current biometric feature template region respectively, to obtain at least two biometric feature IDs respectively, and a chain generation module 116 for generating a biometric feature ID chain based on the at least two biometric feature IDs.

Wherein, the identity verification module 130 is used to send the first biometric feature ID, user ID, device ID to the backend 200, and to send the user ID, device ID, and biometric feature ID chain to the backend 200.

Further, the identity verification module 130 is used to send the first biometric feature ID, public key, user ID, device ID to the backend, and to send the user ID, device ID, and biometric feature ID chain to the backend 200.

Wherein, the background 200 includes:
a storage module 210 for receiving the first biometric feature ID and the user ID and device ID sent by the user terminal, and establishing and storing a binding relationship between the first biometric feature ID and the user ID and device ID; and a verification module 220 for performing identity verification based on the biometric feature ID chain, user ID and device ID received from the user terminal as well as the binding relationship stored in the storage module.

When the biometric feature ID chain, user ID and device ID are received from the user terminal 100, the verification module 220 verifies whether the first biometric feature ID stored in the binding relationship is contained in the biometric feature ID chain, and if so, the identity verification is successful. Optionally, when the identity verification is successful, the verification module 220 updates the first biometric feature ID in the binding relationship stored in the storage module 210 to the second biometric feature ID.

Fingerprints, iris, face, finger vein, palm vein and palm print can be used as biometric features here. For illustration purposes, the following illustrates the specific embodiments using fingerprint as an example.

Figure 3:
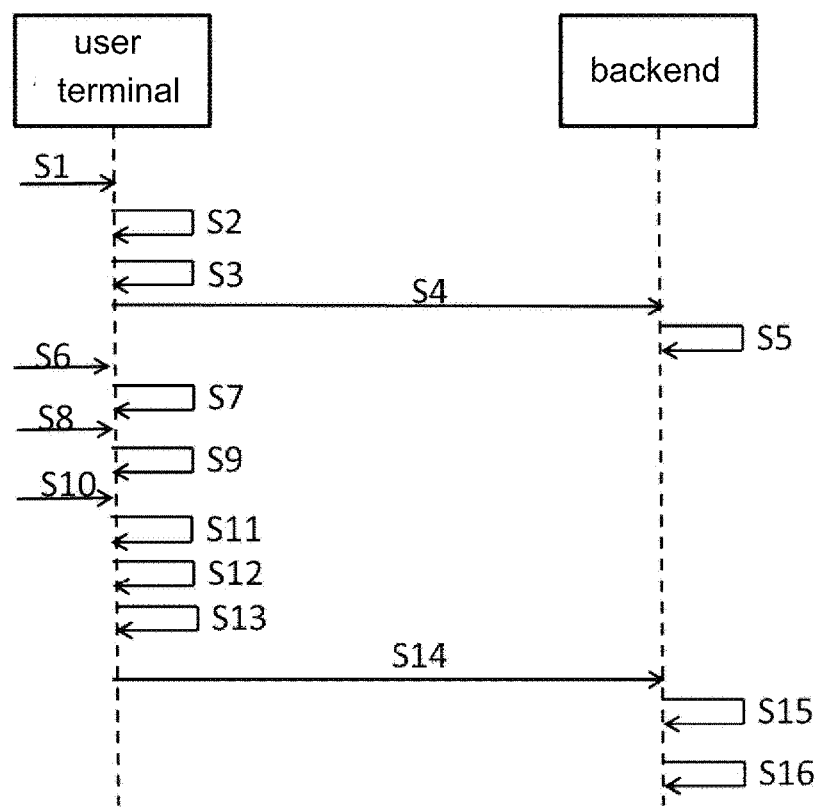
FIG. 3 is a flow diagram of an embodiment of a verification method based on fingerprint ID chain.

FIG. 3 is a flow diagram of an embodiment of a verification method based on fingerprint ID chain.

The verification method based on fingerprint ID chain in this embodiment mainly includes an authentication registration phase and an identity verification phase (where the identity verification phase describes the scenario of the same fingerprint of a user being deleted and then re-entered).

As shown in FIG. 3, the authentication registration phase mainly includes:
S1: The user starts the identity authentication registration by clicking on identity authentication registration, entering the user ID, and inputting the fingerprint;
S2: The user terminal generates an old fingerprint template and an old fingerprint ID (corresponding to the "first biometric feature template and the first biometric feature ID" in the claim) based on the fingerprint entered, and places them in the current fingerprint template region;
S3: The user terminal generates public and private keys;
S4: The user terminal sends the public key, device ID, user ID and old fingerprint ID data to the backend after signing; and
S5: The backend verifies the signature with the received public key, and stores the binding relationship between the device ID, user ID, the public key and old fingerprint ID.

Next, the identity verification phase includes:
(1) Deleting and re-entering the fingerprint:
S6: The user clicks on the user terminal to delete the fingerprint (i.e. issue the instruction to delete the fingerprint);
S7: The user terminal places the old fingerprint template and the old fingerprint ID of the deleted old fingerprint into the old fingerprint template region;
S8: The user re-enters the fingerprint of the same finger on the user terminal;
S9: The user terminal generates a new fingerprint template and a new fingerprint ID (corresponding to the "second biometric feature template and the second biometric feature ID" in the claim) for the new fingerprint entered, and places them in the current fingerprint template region;
(2) Initiating verification after fingerprint re-entry:
S10: The user inputs the fingerprint to be verified;
S11: The user terminal matches the fingerprint to be verified in the current fingerprint template region to obtain a new fingerprint ID;
S12: The user terminal matches the fingerprint to be verified in the old fingerprint template region to obtain the old fingerprint ID;
S13: The user terminal forms a fingerprint ID chain with new and old fingerprint IDs;
S14: The user terminal sends the fingerprint ID chain, device ID, and user ID to the backend after signing with the user private key.
S15: The backend verify the signature using the public key; and
S16: The backend queries whether the fingerprint ID in the binding relationship is contained in the received fingerprint ID chain, and if the result is positive, the verification succeeds, otherwise the verification fails.

Figure 4:
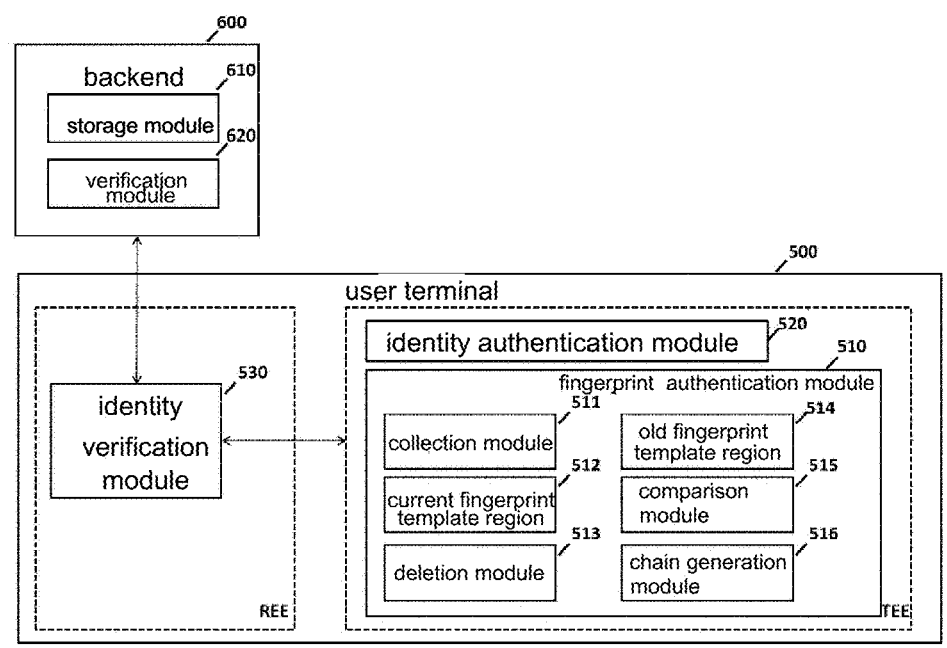
FIG. 4 is a structural diagram of an embodiment of a verification system based on fingerprint ID chain.

FIG. 4 is a structural diagram of an embodiment of a verification system based on fingerprint ID chain.

As shown in FIG. 4, the verification system based on fingerprint ID chain according to this embodiment includes a user terminal 500 and a backend 600.

Wherein, the user terminal 500 includes:
a fingerprint authentication module 510 for collecting new/old fingerprint, generating new/old fingerprint template and new/old fingerprint ID corresponding to the new/old fingerprint, and generating fingerprint ID chains based on the old and new fingerprint IDs; and
an identity authentication module 520 for generating public and private keys and encrypting new and old fingerprint IDs and fingerprint ID chains using the public key; and
an identity verification module 530 for performing data interaction with the backend and calling the fingerprint authentication module 510 and the identity authentication module 520.

The backend 600 includes:
a storage module 610 for establishing and storing the binding relationship between the old fingerprint ID and the user ID and device ID; and
a verification module 620 for performing identity verification based on the fingerprint ID chain, user ID and device ID received from the user terminal, and the binding relationship stored in the storage module 610.

In the user terminal 500, the identity verification module 530 can be arranged in the REE environment, and the fingerprint authentication module 510 and identity authentication module 520 can be arranged in the TEE environment.

Wherein, the verification module 620, when receiving the biometric feature ID chain, user ID and device ID from the user terminal 400, verifies whether the old biometric feature ID stored in the binding relationship is included in the biometric feature ID chain, and if so, the identity verification is successful. Optionally, when the identity verification is successful, the verification module 620 updates the old first feature biometric ID in the binding relationship stored in storage module 210 to the new biometric feature ID.

In this embodiment, as an example, the fingerprint authentication module 510 includes:
a collection module 511 for collecting the old fingerprint and generating the fingerprint template and old fingerprint ID corresponding to the old fingerprint, and collecting the new fingerprint and generating the new fingerprint template and new fingerprint ID corresponding to the new fingerprint, and for collecting the fingerprint to be verified;
a current fingerprint template region 512 for storing the fingerprint template and fingerprint ID of old or new fingerprint collected by the collection module 511.
a deletion module 513 for deleting the fingerprint template and fingerprint ID of the fingerprint stored in the current fingerprint template region 112 according to the deletion instruction;
an old fingerprint template region 514 for storing the fingerprint template and fingerprint ID of the fingerprint deleted by the deletion module 513;
a comparison module 515 for matching the fingerprint to be verified with the fingerprint template in the old fingerprint template region and the fingerprint template in the current fingerprint template region respectively, to obtain at least two fingerprint IDs respectively; and
a chain generation module 516 for generating a fingerprint ID chain based on the at least two fingerprint IDs.

The verification method based on biometric feature ID chain and the verification system based on biometric feature ID chain according to the present invention propose a technical idea for constituting a biometric feature ID chain, and a technical idea for performing identity verification using a biometric feature ID chain based on the same biometric feature. A biometric feature ID chain based on the same biometric feature contains the historical biometric feature ID of the same biometric feature on the same user terminal, which enables the backend to query the historical record of the biometric feature ID of the same user terminal based on the biometric feature ID chain, so as to complete the matching of the specified biometric feature.

As mentioned above, in the present invention, a biometric feature ID chain containing the history of a biometric feature of the same user terminal is generated when the biometric feature is re-entered locally by the user terminal. In the authentication registration phase and the identity verification phase, the biometric feature ID chain is sent to the backend, which matches the biometric feature ID chain with the device ID and user ID, thereby solving the problem that the biometric feature of the user at the same user terminal cannot be used after being deleted and re-entered.

A computer device includes: a memory; a processor; and a computer program stored on the memory and capable of being running on the processor, wherein, the operation of the computer program enables the implementation of the verification method based on biometric feature ID chain when the computer program is executed by the processor.

The above examples mainly illustrate the verification method based on biometric feature ID chain and the verification system based on biometric feature ID chain of the present invention. Although only some of the specific embodiments of the present invention are described, it should be understood by ordinary technicians in the field that the present invention can be implemented in many other forms without deviating from its purpose and scope. Therefore, the examples and methods of implementation shown are considered schematic and not restrictive, and the present invention may cover various modifications and replacements without departing from the spirit and scope of the present invention as defined by the appended claims.

What is claimed is:

1. A verification method based on biometric feature identity (ID) chain, comprising:
   an acquisition step comprising acquiring, by a user terminal, a biometric feature to be verified;
   a comparison step comprising comparing, by the user terminal, the biometric feature to be verified with a biometric feature template in an old biometric feature template region and comparing the biometric feature to be verified with a biometric feature template in a current biometric feature template region, thereby matching at least two biometric feature IDs;
   an ID chain generation step comprising generating, by the user terminal, a biometric feature ID chain based on the at least two biometric feature IDs;
   a sending step sending, by the user terminal, a user ID, a device ID and the biometric feature ID chain to a backend
   to perform identity verification based on the user ID, device ID, and the biometric feature ID chain received as well as a pre-stored binding relationship.

2. The verification method based on biometric feature ID chain according to claim 1, further comprising:
   a verification step comprising performing, by the backend, identity verification based on the user ID, device ID, and the biometric feature ID chain received as well as a pre-stored binding relationship, by pre-storing a binding relationship between a first biometric feature ID and the user ID and device ID, and verifying whether the first biometric feature ID stored in the binding relationship is contained in the biometric feature ID chain, and if so, the identity verification is successful.

3. The verification method based on biometric feature ID chain according to claim 1, wherein, before the acquisition step, further comprising:
   an authentication registration step comprising acquiring a first biometric feature, generating a corresponding biometric feature template and a first biometric feature ID based on the first biometric feature, storing the biometric feature template and the first biometric feature ID of the first biometric feature in a current biometric feature template region, and sending the first biometric feature ID of the first biometric feature, the user ID and the device ID to the backend;
   a pre-storage step comprising receiving, by the backend, the first biometric feature ID of the first biometric feature, the user ID and the device ID, and establishing and storing a binding relationship between the first biometric feature ID and the user ID and the device ID; and
   a deletion step comprising acquiring an instruction to delete the first biometric feature, and deleting the biometric feature template and the first biometric feature ID of the first biometric feature from the current biometric feature template region, and storing them in the old biometric feature template region.

4. The verification method based on biometric feature ID chain according to claim 3, wherein, after the deletion step and before the acquisition step, further comprising:
   a re-entry step comprising acquiring, by the user terminal, a second biometric feature, generating a corresponding biometric feature template and a second biometric feature ID based on the second biometric feature, and storing the biometric feature template and the second biometric feature ID of the second biometric feature in the current biometric feature template region, where the second biometric feature is the same as the first biometric feature.

5. The verification method based on biometric feature ID chain according to claim 4, wherein:
   performing, by the backend, identity verification based on the user ID, device ID, and the biometric feature ID chain received as well as a pre-stored binding relationship, by pre-storing a binding relationship between a first biometric feature ID and the user ID and device ID, and verifying whether the first biometric feature ID stored in the binding relationship is contained in the biometric feature ID chain, and if so, the identity verification is successful, when the identity verification is successful, the first biometric feature ID in the binding relationship is updated to the second biometric feature ID.

6. The verification method based on biometric feature ID chain according to claim 3, wherein:
   in the authentication registration step, sending a public key to the backend along with the first biometric feature ID of the first biometric feature, the user ID and the device ID; and
   in the pre-storage step, the backend receiving the first biometric feature ID of the first biometric feature, the user ID, the device ID and the public key, and establishing and storing the binding relationship between the first biometric feature ID and the user ID, the device ID as well as the public key.

7. The verification method based on biometric feature ID chain according to claim 1, wherein:
the first and second biometric features are any of the following: fingerprint, iris, face, finger vein, palm vein, and palm print.

8. A verification method based on biometric feature ID chain, comprising:
an acquisition step comprising acquiring a biometric feature to be verified;
a comparison step comprising comparing the biometric feature to be verified with a biometric feature template in an old biometric feature template region, and comparing the biometric feature to be verified with a biometric feature template in a current biometric feature template region, to match at least two biometric feature IDs;
an ID chain generation step comprising generating a biometric feature ID chain based on the at least two biometric feature IDs; and
a sending step comprising sending a user ID, a device ID and the biometric feature ID chain to a backend for identity verification.

9. The verification method based on biometric feature ID chain according to claim 8, wherein:
the identity verification step includes: the backend storing a binding relationship between a first biometric feature ID and the user ID and device ID, and verifying whether the first biometric feature ID stored in the binding relationship is contained in the biometric feature ID chain, and if so, the identity verification is successful.

10. The verification method based on biometric feature ID chain according to claim 8, wherein, before the acquisition step, further comprising:
an authentication registration step comprising acquiring a first biometric feature, generating a corresponding biometric feature template and a first biometric feature ID based on the first biometric feature, storing the biometric feature template and the first biometric feature ID of the first biometric feature in a current biometric feature template region, and sending the first biometric feature ID of the first biometric feature, the user ID and the device ID to the backend to establish a binding relationship between the first biometric feature ID and the user ID and device ID; and
a deletion step comprising acquiring an instruction to delete the first biometric feature, deleting the biometric feature template and the first biometric feature ID of the first biometric feature from the current biometric feature template region, and storing the biometric feature template and the first biometric feature ID in the old biometric feature template region.

11. The verification method based on biometric feature ID chain according to claim 10, wherein, after the deletion step and before the acquisition step, further comprising:
a re-entry step comprising acquiring a second biometric feature, generating a corresponding biometric feature template and a second biometric feature ID based on the second biometric feature, storing the biometric feature template and the second biometric feature ID of the second biometric feature in the current biometric feature template region, where the second biometric feature is the same as the first biometric feature.

12. The verification method based on biometric feature ID chain according to claim 8, further comprising:
when the identity verification is successful, updating the first biometric feature ID in the binding relationship to the second biometric feature ID.

13. The verification method based on biometric feature ID chain according to claim 10, further comprising:
in the authentication registration step, sending a public key to the backend along with the first biometric feature ID of the first biometric feature, the user ID and the device ID.

14. The verification method based on biometric feature ID chain according to claim 8, wherein:
the current biometric feature template region stores the corresponding biometric feature template and the first biometric feature ID generated from the first biometric feature when the first biometric feature is acquired, and the biometric feature template and the first biometric feature ID of the first biometric feature are deleted from the current biometric feature template region when an instruction to delete the first biometric feature is acquired, and on the other hand, the current biometric feature template region stores the corresponding biometric feature template and the second biometric feature ID generated from the second biometric feature when the second biometric feature is acquired; and
the old biometric feature template region stores the biometric feature template and the first biometric feature ID of the first biometric feature deleted from the current biometric feature template region when the instruction to delete the first biometric feature is acquired.

15. The verification method based on biometric feature ID chain according to claim 8 wherein:
the first and second biometric features are any of the following: fingerprint, iris, face, finger vein, palm vein, and palm print.

16. A verification system based on biometric feature identity(ID) chain, the verification system comprising:
one or more processors, a backend, and a user terminal configured to
collect, at the user terminal, a first biometric feature and a second biometric feature, and respectively generate a biometric feature template and a first biometric feature ID corresponding to the first biometric feature and a biometric feature template and a second biometric feature ID corresponding to the second biometric feature, and to collect a biometric feature to be verified, and on the other hand, to match at least two biometric feature IDs based on the biometric feature to be verified and generate a biometric ID chain based on the at least two biometric feature IDs, where the first biometric feature ID of the first biometric feature and the second biometric feature ID of the second biometric feature are randomly generated, respectively,
perform, at the user terminal, data interaction with the backend and identity verification
receive, at the backend, the first biometric feature ID, the user ID and device ID sent by the user terminal, and establish and store a binding relationship between the first biometric feature ID and the user ID and device ID; and
perform identity verification, at the backend, based on the biometric feature ID chain, the user ID and the device ID received from the user terminal and the stored binding relationship the verification system further configured to:
  collect the first biometric feature and generate the biometric feature template and the first biometric feature ID corresponding to the first biometric feature, and collect the second biometric feature and generate the biometric feature template and the second biometric feature ID corresponding to the second biometric feature, and collect the biometric feature to be verified,
  store the biometric feature template and the biometric feature ID of the first or second biometric feature in a current biometric feature template region,
  delete the biometric feature template and the biometric feature ID of the biometric feature stored in the current biometric feature template region according to a deletion instruction;
  store the deleted biometric feature template and the biometric feature ID of the biometric feature in an old biometric feature template region;
  compare the biometric feature to be verified with the biometric feature template in the old biometric feature template region, and compare the biometric feature to be verified with the biometric feature template in the current biometric feature template region, to respectively match at least two biometric feature IDs, and
  generate a biometric feature ID chain based on the at least two biometric feature IDs.

* * * * *